United States Patent Office 2,971,991
Patented Feb. 14, 1961

2,971,991
METHOD FOR INCREASING THE RATE OF AIR OXIDATION OF POLYMERS AND COPOLYMERS OF BUTADIENE

Donald F. Koenecke, Westfield, N.J., assignor to Esso Research and Engineering Company, a corporation of Delaware No Drawing. Filed Oct. 1, 1958, Ser. No. 764,494

5 Claims. (Cl. 260—669)

This invention relates to air-blown polymers of a conjugated diolefin and copolymers thereof with other comonomers. In one embodiment a liquid polymer of butadiene is blown with air in the presence or absence of catalysts for a time and at a temperature sufficient to produce a new and useful product.

Synthetic drying oils can be prepared by various methods from butadiene alone or from mixtures containing butadiene together with materials copolymerizable therewith. Sodium polymerization, emulsion polymerization, as well as bulk polymerization in the presence of a diluent and a peroxide type catalyst have been used for this purpose with varying degrees of success. However, among the difficulties encountered with various synthetic drying oils were poor drying rate, poor flexibility, poor adhesion of air-dried coatings, poor wetting properties and consequent difficulty of grinding in pigments, poor gloss and streakiness of brushed enamel films.

It is known that the above disadvantages of synthetic drying oils may be overcome by contacting the drying oil with oxygen or air in the presence or absence of a solvent and catalysts and for a time and at a temperature sufficient to incorporate a small amount of oxygen in the oil. However, the rate of oxidation is often very slow, sometimes taking as long as several days.

In accordance with the present invention, it has been found that the oxidation rate can be increased severalfold by the addition of a small amount of 1,10 (ortho) phenanthroline ethyl hexoate to the polymer oil prior to oxidation. An oil having a viscosity between 0.3 and 22 poises is oxidized by blowing air or oxygen into a tube or vertical tank containing the copolymer and the 1,10 (ortho) phenanthroline ethyl hexoate. The air or oxygen is preferably introduced through a porous thimble or distributing plate near the bottom of the tank so as to afford maximum introduction of oxygen into the polymer. The temperature is maintained at 20° to 120° C. and the blowing is continued until the desired amount of oxygen has been incorporated.

The synthetic oils to which the present invention is applicable are oily polymers of butadiene, isoprene, dimethyl butadiene, piperylene, methyl pentadiene or other conjugated diolefins having four to six carbon atoms per molecule. Instead of polymerizing any of the aforesaid diolefins alone, they may be copolymerized in admixtures with each other or in admixtures with minor amounts of ethylenically unsaturated monomers copolymerizable therewith, e.g., with 0 to 40% of styrene, styrenes having alkyl groups substituted on the ring such as para methyl styrene, dimethyl styrene or diethyl styrene, acrylonitrile, methacrylonitrile, methyl acrylate, methyl methacrylate, vinyl isobutyl ether, methyl vinyl ketone, and isopropenyl methyl ketone. Such synthetic oils may be advantageously prepared by mass polymerization either in the presence of a hydrocarbon soluble peroxide catalyst such as benzoyl peroxide or cumene hydroperoxide, or in the presence of metallic sodium when the monomers consist of a diolefin or of a mixture of a diolefin with a styrene compound. Under proper conditions the emulsion polymerization technique may also be adapted to the preparation of drying oils to which the present invention is applicable. Suitable polymerization methods are illustrated below. Throughout the present description it will be understood that all proportions are expressed on a weight basis unless otherwise specified.

SYNTHESIS METHOD A

For example, 100 parts of butadiene-1,3, 50 parts of straight run mineral spirits boiling between 150° and 200° C. (Varsol), 3 parts of t-butyl hydroperoxide (60% pure) and 0.75 part of diisopropyl xanthogen disulfide are heated in a closed reactor at about 90° C. for 40 hours, whereupon the residual pressure is released and unreacted butadiene is allowed to volatilize from the polymerized mixture at 70° C. The resulting product, which is a clear, water-white solution, consists typically of about 60 parts of oily polymer of butadiene, about 4 parts of butadiene dimer, plus solvent and some t-butyl alcohol. This solution of polymer is then preferably fractionated to remove the dimer and usually adjusted to 50% non-volatile matter content. The non-volatile constituent, which is the oily polymer of butadiene, has a molecular weight between 1,000 and 10,000, preferably between 2,000 and 5,000. It will be understood, of course, that the foregoing procedure is only illustrative and that it can be modified in many ways, particularly as described in U.S. Patent No. 2,586,594 of Arundale et al. which describes alternative monomers, catalysts, reaction diluents, polymerization modifiers, suitable ranges of proportions of the various ingredients, suitable ranges of polymerization conditions, etc.

SYNTHESIS METHOD B

An alternative polymerization method using sodium as catalyst is illustrated as follows: 80 parts of butadiene-1,3, 20 parts of styrene, 200 parts of straight run mineral spirits boiling between 150° and 200° C., 40 parts of dioxane, 0.2 part of isopropanol and 1.5 parts of finely dispersed sodium are heated at about 50° C. in a closed reactor provided with an agitator. Complete conversion is obtained in about 4.5 hours whereupon the catalyst is destroyed by adding an excess of isopropanol to the polymerized charge. The crude product is cooled, neutralized with carbon dioxide or glacial acetic acid or other anhydrous organic acid and filtered. Instead of neutralizing the alcohol-treated product, the acid may also be added directly to the crude product containing residual metallic sodium and the latter destroyed by the acid. The colorless filtrate is then fractionally distilled to remove the alcohol and modifiers such as dioxane. Finally, additional hydrocarbon solvent is preferably distilled off until a product containing about 50–100% non-volatile matter is obtained.

Again it will be understood that the described sodium polymerization method may be varied considerably as by omitting the styrene co-reactant; or by adding the styrene only after the polymerization of butadiene monomer has begun; or dioxane may be replaced by 10 to 35 parts of another ether modifier having 3 to 8 carbon atoms such as methyl ethyl ether, dibutyl ether or phenetole; or the modifier may be omitted altogether, especially when it is not essential to obtain a perfectly colorless product. Similarly, isopropanol is not necessary, though aliphatic alcohols of less than 6 carbon atoms generally have the beneficial effect of promoting the reaction when present in amounts ranging from about 2 to 50%, based on the weight of sodium catalyst. Furthermore, the mineral spirits may be replaced by other inert hydrocarbon diluents boiling between about −15° and 250° C., preferably between 60° and 200° C., e.g., butane, benzene, xylene, naphtha, cyclohexane and the like. The diluents are usually used in amounts ranging from 50 to 500 parts per 100 parts of monomer. The reaction temperature may vary between about 40° C. and 100° C., preferably around 65° to 85° C. As a catalyst, 0.1 to 10 parts of dispersed metallic sodium is used per 100 parts of monomer, sodium particle sizes below 100 microns being particularly effective.

A particularly suitable process for the preparation of the polymer oil in accordance with this synthesis is the multi-stage continuous process described and claimed in Serial No. 485,392 filed February 1, 1955, now U.S. Patent No. 2,849,510, in the name of Stanley E. Jaros et al. The disclosures of this application are incorporated herein by reference.

The polymers produced by the above process have molecular weights up to 10,000 and viscosities up to 22 poises at 50% N.V.M. and are pale yellow to colorless liquids.

As indicated above, the blowing of the polymeric drying oils is best carried out in a solvent of moderate to good solvency, e.g., solvents or solvent mixtures having a kauri butanol value of at least 40. At least a substantial portion of aromatic solvent is generally needed to secure such a KB value, and such aromatic content is highly beneficial in promoting oxygen uptake during the blowing treatment. It also aids materially in permitting high oxygen contents to be secured in the treatment without encountering the instability which induces gelation of the mass being treated. While mixtures of high and low kauri butanol value solvents are generally useful, the oil can be dissolved in strong solvent(s) from the start, thereby eliminating low solvency solvents. The choice of solvents will of course depend on the oxygen content which is desired in the finished oil as well as on the formulations of the coating compositions which are to be made from the blown oil, and in the interest of economy it is generally desirable to use the cheapest solvent(s) which possess the needed attributes of kauri butanol value and compatibility with the various ingredients of the finished coating vehicle which is to be formulated.

Suitable solvents include benzene, toluene, hemimellitene, pseudocumene, mesitylene, propyl benzene, cymene, ethyl toluene, methyl ethyl benzene, xylenes, Solvesso 100 (a mixture of aromatic hydrocarbons boiling from about 150° to 175° C.), Solvesso 150 (a mixture of aromatic hydrocarbons boiling about 190° to 210° C.), and Varsol (a straight run mineral spirit boiling 140° to 205° C. varying in aromatic content from 5 to 35 wt. percent.

In the blowing treatment it is desirable to diffuse the air or oxygen as intimately as possible into the oil, and a variety of diffusers and other pieces of equipment are already known and available for this purpose. Combinations of mechanical agitation and blowing are useful, and countercurrent pumping of the oil with or without mechanical agitation is beneficial. As indicated previously, a refluxing column on the blowing chamber is desirable to reduce the loss of solvents from the mass. Some entrainment losses are encountered, however, even then, so that additional solvents may need to be added from time to time if a fairly uniform non-volatile content is to be maintained. High boiling solvents help to minimize such losses.

Catalysts suitable for the oxidation reaction of this invention include the metal driers such as cobalt, lead, iron, zinc and manganese naphthenate, octoates, resinates, linoleates, and the like. These catalysts are used in amounts ranging from 0.001% to 1.0%. Peroxides such as benzoyl peroxide and the like may be added to reduce the induction period. The amount of 1,10 (ortho) phenanthroline ethyl hexoate added to increase the rate of oxidation is between 1 and 20 parts per part of metal dried calculated as metal.

The advantages of the invention will be better understood from a consideration of the following experimental data which are given for the sake of illustration, but without intention of limiting the invention thereto. It is understood that conditions of temperature and time of reaction, ratio of reactants, degree of dilution, presence or lack of solvents and the like will depend upon factors including the degree of oxidation desired and the nature of the starting polymer.

*Example I*

A butadiene-styrene polymer oil was prepared from the following charge:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight run mineral spirits; API gravity, 49.0; flash 105° F.; boiling range, 150° to 200° C.; solvent power, 33–37 kauri-butanol value (reference scale: benzene—100 K.B. value, n-heptane 25.4 K.B. value).
[2] Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. The resulting product had a viscosity of 1.5 poises at 50% N.V.M. and the nonvolatile portion thereof had an average molecular weight of about 3,000.

*Example II*

Two 100 gram portions of the above oil were each dissolved in 186 grams of Solvesso 100 (boiling range 315°–350° F.) and 0.02% by weight of manganese (as naphthenate) and 0.1% by weight of t-butyl hydroperoxide (based on the polymer oil). To one of the two portions was also added 0.2% by weight (based on polymer oil) of 1,10 (ortho) phenanthroline ethyl hexoate (10 parts per part of manganese). Both solutions were agitated in a one-liter flask by means of a Premier dispersator operating at 3000 r.p.m. while a stream of oxygen was led into the vapor phase at the rate of 250 ml. per minute at a temperature of 105° C. At equal oxygen contents the receipe containing the phenanthroline was completed in about one-sixth the time of the other. The following data were obtained:

| o-phenanthroline | $O_2$ Content, percent | Time, min. |
|---|---|---|
| no | 11.7 | 180 |
| yes | 11.8 | 35 |

*Example III*

A second pair of runs was carried out under the same conditions as Example II but the oxidation was continued until a larger amount of oxygen was incorporated. The relative rates were found to be the same as in Example II as shown by the following data:

| o-phenanthroline | $O_2$ Content, percent | Time |
|---|---|---|
| no | 16.9 | 4.5 hrs. |
| yes | 16.8 | 55 min. |

The nature of the present invention having been thus fully set forth and specific examples of the same given, what is claimed as new and useful and desired to be secured by Letters Patent is:

1. A process for improving the rate of oxidation of an oily diolefin polymer chosen from the group consisting of homopolybutadiene and copolymers of butadiene and styrene which comprises contacting the said oil in a solvent having a kauri butanol value of at least 40 with an oxygen-containing gas at a temperature between 20° and 120° C. in the presence of 0.001 to 1.0% of a metal drier and 1 to 20 parts of 1,10 (ortho) phenanthroline ethyl hexoate per part of metal in metal drier until the desired amount of oxygen has been incorporated into the polymer.

2. Process according to claim 1 in which the solvent is an aromatic solvent boiling between about 150° and 175° C.

3. Process according to claim 1 in which the polymer oil is polybutadiene.

4. Process according to claim 1 in which the polymer oil is a copolymer of butadiene and styrene.

5. Process according to claim 4 in which the amount of 1,10 (ortho) phenanthroline ethyl hexoate is 10 parts per part of metal in metal drier.

References Cited in the file of this patent

UNITED STATES PATENTS

| | | |
|---|---|---|
| 2,826,618 | Gleason | Mar. 11, 1958 |
| 2,872,345 | Slotterbeck | Feb. 3, 1959 |

OTHER REFERENCES

Worthington et al.: "Paint Oil Chemical Review," vol. 112, No. 11, pages 40–46 (1949), Abstracted in Chemical Abstracts, vol. 43 (1949), 6836d.